United States Patent
Chiong

(10) Patent No.: US 9,562,139 B2
(45) Date of Patent: *Feb. 7, 2017

(54) PROCESS FOR FORMING LOW HALOGEN CONTENT POLYARYLENE SULFIDES

(71) Applicant: Ticona LLC, Florence, KY (US)

(72) Inventor: Hendrich Alvarez Chiong, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,310

(22) Filed: Sep. 9, 2014

(65) Prior Publication Data

US 2015/0087777 A1 Mar. 26, 2015

Related U.S. Application Data

(60) Provisional application No. 61/882,301, filed on Sep. 25, 2013.

(51) Int. Cl.
    *C08G 75/14*  (2006.01)
    *C08G 75/00*  (2006.01)

(52) U.S. Cl.
    CPC ..................... *C08G 75/14* (2013.01)

(58) Field of Classification Search
    CPC ........................................... C08G 75/14
    USPC .................. 528/373, 314; 524/606; 422/134
    See application file for complete search history.

(56) References Cited

U.S. PATENT DOCUMENTS

| | | | |
|---|---|---|---|
| 3,869,433 A | 3/1975 | Campbell | |
| 4,038,259 A | 7/1977 | Campbell et al. | |
| 4,038,260 A | 7/1977 | Campbell | |
| 4,038,262 A | 7/1977 | Edmonds, Jr. | |
| 4,038,263 A | 7/1977 | Edmonds, Jr. et al. | |
| 4,039,518 A | 8/1977 | Campbell | |
| 4,056,515 A | 11/1977 | Vidaurri, Jr. | |
| 4,060,520 A | 11/1977 | Irvin | |
| 4,064,114 A | 12/1977 | Edmonds, Jr. | |
| 4,089,847 A | 5/1978 | Edmonds, Jr. et al. | |
| 4,096,132 A | 6/1978 | Edmonds, Jr. | |
| 4,370,470 A | 1/1983 | Vidaurri et al. | |

(Continued)

FOREIGN PATENT DOCUMENTS

| | | |
|---|---|---|
| EP | 2 322 485 A1 | 5/2011 |
| JP | H08118502 | 5/1995 |

(Continued)

OTHER PUBLICATIONS

U.S. Appl. No. 14/481,257 claims; Sep. 2014.*

(Continued)

*Primary Examiner* — Duc Truong
(74) *Attorney, Agent, or Firm* — Dority & Manning, P.A.

(57) ABSTRACT

A multi-stage process and system for formation of a polyarylene sulfide is described. A first polymerization stage of the formation process can include reaction of a sulfide monomer with a dihaloaromatic monomer to form a prepolymer. A second polymerization stage can include further polymerization of the prepolymer with a sulfur-containing monomer and a dihaloaromatic monomer to form a low halogen content polyarylene sulfide. The amount of sulfur utilized in the second polymerization stage is a low fraction of the total amount of sulfur utilized in the multi-stage process.

25 Claims, 3 Drawing Sheets

(56) References Cited

U.S. PATENT DOCUMENTS

| | | |
|---|---|---|
| 4,393,197 A | 7/1983 | Edmonds, Jr. |
| 4,451,640 A | 5/1984 | Shiiki et al. |
| 4,457,812 A | 7/1984 | Rado |
| 4,495,332 A | 1/1985 | Shiiki et al. |
| 4,501,902 A | 2/1985 | Cleary |
| 4,514,558 A | 4/1985 | Shiiki et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,745,167 A | 5/1988 | Iizuka et al. |
| 4,761,468 A | 8/1988 | Okamoto et al. |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,841,019 A | 6/1989 | Iwasaki et al. |
| 4,931,516 A | 6/1990 | Iizuka et al. |
| 4,976,825 A | 12/1990 | Iwasaki et al. |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,086,163 A | 2/1992 | Scoggins et al. |
| 5,110,902 A | 5/1992 | Scoggins et al. |
| 5,126,430 A | 6/1992 | Senga et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,635,587 A | 6/1997 | Koyama et al. |
| 5,688,908 A | 11/1997 | Haubs et al. |
| 5,744,576 A | 4/1998 | Miyahara et al. |
| 5,756,654 A | 5/1998 | Sase et al. |
| 5,777,069 A | 7/1998 | Tsuda et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,898,061 A | 4/1999 | Sase et al. |
| 5,929,203 A | 7/1999 | Ash et al. |
| 6,001,934 A | 12/1999 | Yamanaka et al. |
| 6,201,097 B1 | 3/2001 | Geibel et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,562,900 B2 | 5/2003 | Okamoto et al. |
| 6,600,009 B2 | 7/2003 | Inoue et al. |
| 6,646,105 B2 | 11/2003 | Shirota |
| 6,653,437 B2 | 11/2003 | Hinokimori et al. |
| 6,743,890 B2 | 6/2004 | Bando |
| 6,750,319 B2 | 6/2004 | Koyama |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,426,552 B2 | 4/2013 | Hinokimori et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,680,230 B2 | 3/2014 | Konno et al. |
| 2003/0150804 A1 | 8/2003 | Haubs et al. |
| 2004/0249118 A1 | 12/2004 | Kagoshima et al. |
| 2005/0171332 A1 | 8/2005 | Koyama |
| 2006/0084785 A1 | 4/2006 | Sato et al. |
| 2010/0137531 A1 | 6/2010 | Horiuchi |
| 2010/0163499 A1 | 7/2010 | Odueyungbo |
| 2010/0210813 A1 | 8/2010 | Foder et al. |
| 2010/0228003 A1 | 9/2010 | Hinokimori et al. |
| 2010/0234559 A1 | 9/2010 | Sato et al. |
| 2011/0124825 A1 | 5/2011 | Konno et al. |
| 2011/0178268 A1 | 7/2011 | Suzuki et al. |
| 2011/0319587 A1 | 12/2011 | Hinokimori |
| 2012/0165501 A1 | 6/2012 | Kaiho et al. |
| 2012/0322972 A1 | 12/2012 | Koizumi et al. |
| 2012/0329984 A1 | 12/2012 | Kim et al. |
| 2013/0022808 A1 | 1/2013 | Taniguchi et al. |
| 2013/0065054 A1 | 3/2013 | Ichinose et al. |
| 2013/0068256 A1 | 3/2013 | Kobayashi et al. |
| 2013/0116401 A1 | 5/2013 | Kimura et al. |
| 2013/0253147 A1 | 9/2013 | Ichinose et al. |
| 2014/0128568 A1 | 5/2014 | Hinokimori |
| 2015/0065664 A1 | 3/2015 | Konno et al. |

FOREIGN PATENT DOCUMENTS

| | | |
|---|---|---|
| JP | H07228699 | 8/1995 |
| JP | H07242746 | 9/1995 |
| JP | H07292107 | 11/1995 |
| JP | H07316428 | 12/1995 |
| JP | H07330911 | 12/1995 |
| JP | H0820644 | 1/1996 |
| JP | H0820645 | 1/1996 |
| JP | H08100064 | 4/1996 |
| JP | H08118503 | 5/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08233413 | 10/1996 |
| JP | H08253587 | 10/1996 |
| JP | H08269199 | 10/1996 |
| JP | H08269200 | 10/1996 |
| JP | H08319348 | 12/1996 |
| JP | H0967439 | 3/1997 |
| JP | H09104816 | 4/1997 |
| JP | H09124940 | 5/1997 |
| JP | H09194726 | 7/1997 |
| JP | H09296042 | 11/1997 |

(56) References Cited

FOREIGN PATENT DOCUMENTS

| | | |
|---|---|---|
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| WO | WO 2013/061561 A1 | 5/2013 |
| WO | WO 2013/147141 | 10/2013 |

OTHER PUBLICATIONS

International Patent Application No. PCT/US2014/54734; International Search Report and Written Opinion dated Nov. 25, 2014; (7 pages).

International Patent Application No. PCT/US2014/54741; International Search Report and Written Opinion dated Nov. 25, 2014; (7 pages).

International Patent Application No. PCT/US2014/54724; International Search Report and Written Opinion dated Dec. 8, 2015; (6 pages).

International Patent Application No. PCT/US2014/54728; International Search Report and Written Opinion dated Jan. 16, 2015; (11 pages).

International Patent Application No. PCT/US2014/54745; International Search Report and Written Opinion dated Nov. 25, 2014; (7 pages).

International Patent Application No. PCT/US2014/54750; International Search Report and Written Opinion dated Jan. 22, 2014; (11 pages).

* cited by examiner

PROCESS FOR FORMING LOW HALOGEN CONTENT POLYARYLENE SULFIDES

CROSS REFERENCE TO RELATED APPLICATIONS

The present application claims filing benefit of U.S. Provisional Patent application 61/882,301 having a filing date of Sep. 25, 2013, which is incorporated herein by reference in its entirety.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic monomer with an alkali metal sulfide or an alkali metal hydrosulfide in an organic amide solvent, forming polymers that include halogen at the termini.

A desire for low halogen content polymers has developed over the last several years. For instance, sulfur-containing polymers with low organically-bound chlorine content are useful in electrical and computer applications. Moreover, the environmental impact of halogens has prompted many industries to examine raw materials with lower halogen content. Attempts have been made to produce low halogen-content sulfur-containing polymers. For instance, higher molecular weight polymers, which have fewer terminal groups and hence lower halogen content, have been used in low halogen applications. Unfortunately, high molecular weight polymers have high melt viscosity, leading to processability problems. Other attempts have included the use of more costly raw materials and chemically removing halogens following formation by use of reducing/nucleophilic reagents, which adds processing steps and costs to the formation process.

What is needed in the art is a method for formation of low halogen content sulfur containing polymers. For instance, methods for the formation of low halogen content sulfur containing polymers having a low melt viscosity and good processability would be of great benefit.

SUMMARY OF THE INVENTION

A multi-stage method is disclosed for forming a polyarylene sulfide. For instance, a method can include reacting a complex including an alkali metal organic amine carboxylic acid salt and an alkali metal hydrogen sulfide with a dihaloaromatic monomer to form a polyarylene sulfide prepolymer. The method also includes increasing the molecular weight of the polyarylene sulfide prepolymer to form the polyarylene sulfide via reaction of the prepolymer with a second dihaloaromatic monomer and a sulfur-containing monomer in an organic amide solvent. This second polymerization can be carried out using a low fraction of the total amount of sulfur added to the formation process. For instance from about 0.1% to about 10% by weight of the total amount of sulfur charged to the multi-stage process can be charged to the second polymerization reaction. According to the process, the second reaction can increase the molecular weight of the polyarylene sulfide and the product polymer can have a low halogen content.

Also disclosed are low molecular weight polyarylene sulfides that can be formed according to the process. For instance, a polyarylene sulfide is disclosed that has a melt viscosity of about 500 Poise or less as determined in accordance with ISO Test No. 1143 at a shear rate of 1200 s$^{-1}$ and at a temperature of 310° C. and has a halogen content of about 1000 ppm or less.

BRIEF DESCRIPTION OF THE FIGURES

The present disclosure may be better understood with reference to the following figures.

DETAILED DESCRIPTION

Figure 1:
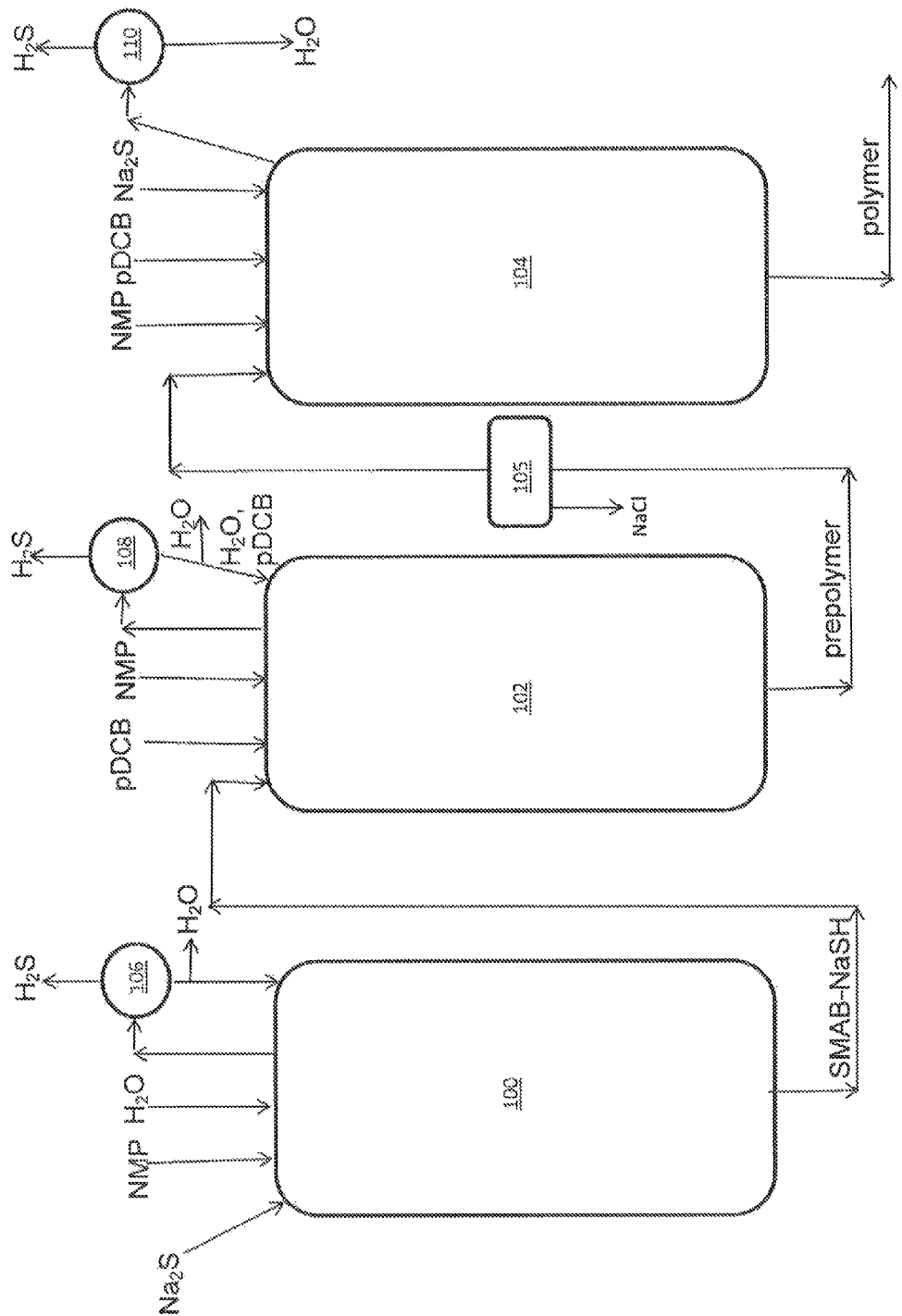
FIG. 1 is a flow diagram for an embodiment of a polyarylene sulfide formation process as described herein.

It is to be understood by one of ordinary skill in the art that the present discussion is a description of exemplary embodiments only, and is not intended as limiting the broader aspects of the present invention.

The present disclosure is generally directed to methods of forming a low halogen content sulfur containing polymer and polymers as may be formed by the methods. More specifically, disclosed is a multi-stage process and system for formation of a low halogen content polyarylene sulfide. The multi-stage process includes a first polymerization in which a low molecular weight prepolymer is formed via reaction of a complex including an alkali metal organic amine and an alkali metal hydrogen sulfide with a dihaloaromatic monomer. During a second polymerization, the prepolymer is further reacted with a second dihaloaromatic monomer and sulfur-containing monomer. The amount of sulfur that is provided in the second polymerization is a low fraction of the total amount of sulfur provided in the multi-stage process, for instance from about 0.1 to about 10% by weight of the total amount of sulfur is provided in the sulfur-containing monomer of the second polymerization. Through addition of the low fraction of the sulfide reactant at this stage, the second polymerization reaction can increase the molecular weight of the polymer while decreasing the chlorine content of the polymer as compared to the chlorine content of the prepolymer. Thus, the formed polymer can have a desirable molecular weight with a low halogen content. In one embodiment, the molecular weight of the final polymer can be increased during the second reaction, but can still be relatively low, for instance as may be suitable for an injection molding process, and the low molecular weight, low viscosity polymer can also have a low halogen content.

In general, a polyarylene sulfide as may be formed according to the process can be a polyarylene thioether containing repeat units of the formula (I):

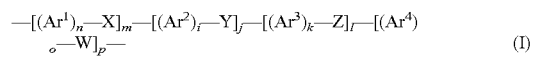
(I)

wherein Ar$^1$, Ar$^2$, Ar$^3$, and Ar$^4$ are the same or different and are arylene units of 6 to 18 carbon atoms; W, X, Y, and Z are the same or different and are bivalent linking groups selected from —SO$_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (-AR—S—) units. In one embodiment the polyarylene sulfide includes at least 85 mol % sulfide linkages attached directly to two aromatic rings. In one embodiment, the polyarylene sulfide formed by the process can be a polyphenylene sulfide, defined herein as containing the phenylene sulfide structure —$(C_6H_4$—$S)_n$— (wherein n is an integer of 1 or more) as a component thereof.

The polyarylene sulfide can have a low halogen content. For example, the polyarylene sulfide can have a halogen (e.g., chlorine) content of about 1000 ppm or less in some embodiments, about 950 ppm or less in some embodiments, about 850 ppm or less in some embodiments, and about 700 ppm or less in some embodiments. In one embodiment, the polyarylene sulfide can have a halogen content of from about 400 ppm to about 1000 ppm. The halogen content of the polymer can be determined according to known methods, for instance via elemental analysis using combustion followed by chromatography (e.g., ion chromatography).

In addition to a low halogen content, the polymer can have a low melt viscosity and good processability characteristics. For instance, the polymer can have a melt viscosity making is suitable for processing according to injection molding processes that require a relatively low melt viscosity polymer so as to properly fill the mold. By way of example, the low halogen content polymer can have a melt viscosity of about 500 Poise or less, about 450 Poise or less, about 400 Poise or less, or about 350 Poise or less. For instance, the polymer can have a melt viscosity from about 50 Poise to about 500 Poise. Melt viscosity can be determined in accordance with ISO Test No. 1143 at a shear rate of 1200 $s^{-1}$ and at a temperature of 310° C.

A formation process for the polymer can be a multi-stage process that includes at least two separate polymerization stages. A first polymerization of the formation process can include reaction of a sulfur-containing complex with a dihaloaromatic monomer to form a prepolymer. The sulfur-containing complex includes a hydrolysis product of an organic amide solvent and alkali metal hydrogen sulfide. A second polymerization of the process can include further polymerization of the prepolymer in the presence of additional monomer to form the final product with a low fraction of the total sulfur in this second polymerization, as detailed herein.

Optionally, the process can include an initial, prepolymerization stage in which the organic amide solvent and an alkali metal sulfide are reacted to form the complex. In one embodiment, the different stages (the prepolymerization complex formation stage, the first polymerization and the second polymerization) can take place in different reactors. The utilization of separate reactors for each of the stages can decrease cycle time, as the total cycle time can be equal to that of the slowest stage, rather than the sum of all stages as in a single reactor system. In addition, the utilization of separate reactors can decrease capital costs, as smaller reactors can be utilized than would be necessary for the same size batch in a single reactor system. Moreover, as each reactor need only meet the specifications of the stage being carried out in that reactor, a single, large reactor that meets the most stringent parameters of all stages of the formation process is not necessary, which can further decrease capital costs.

FIG. 1 illustrates one embodiment of a multi-stage formation process as may be utilized in forming the low halogen content polymer. The first reactor 100 can be utilized for a first stage of the process during which an organic amide solvent and an alkali metal sulfide can react to form a complex that includes a hydrolysis product of the organic amide solvent (e.g., an alkali metal organic amine carboxylic acid salt) and an alkali metal hydrosulfide.

Exemplary organic amide solvents as may be used in a forming the polyarylene sulfide can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The alkali metal sulfide can be, for example, lithium sulfide, sodium sulfide, potassium sulfide, rubidium sulfide, cesium sulfide or a mixture thereof. An alkali metal sulfide can also be generated in situ. For instance, a sodium sulfide hydrate can be prepared within the first reactor 100 following addition of sodium hydrogen sulfide and sodium hydroxide to the reactor 100. When a combination of alkali metal hydrogen sulfide and alkali metal hydroxide are fed to the reactor 100 to form the alkali metal sulfide, the molar ratio of alkali metal hydroxide to alkali metal hydrogen sulfide can be between about 1.00 and about 1.03. In addition, a small amount of an alkali metal hydroxide can be included in the first reactor 100 to remove or react impurities (e.g., to change such impurities to harmless materials) such as an alkali metal polysulfide or an alkali metal thiosulfate, which may be present in a very small amount with the alkali metal sulfide.

In the embodiment illustrated in FIG. 1, the feed to the first reactor 100 can include sodium sulfide ($Na_2S$) (which can be in the hydrate form), N-methyl-2-pyrrolidone (NMP) and water. Reaction between the water, sodium sulfide and the NMP can form a complex including sodium methylaminobutyrate (SMAB—a hydrolysis product of NMP) and sodium hydrogen sulfide (NaSH) (SMAB-NaSH) according to the following reaction scheme:

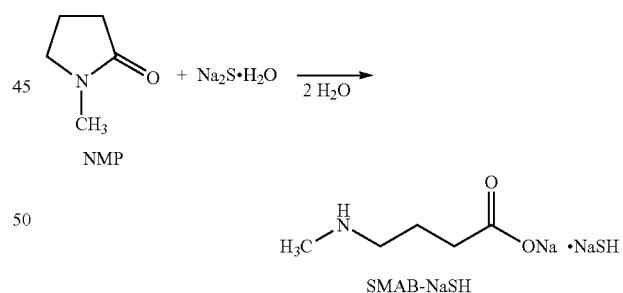

SMAB-NaSH

According to one embodiment, a stoichiometric excess of the alkali metal sulfide can be utilized in the first stage reactor, though this is not a requirement of the formation stage. For instance, the molar ratio of organic amide solvent to sulfur in the feed can be from about 2 to about 4, or from about 2.5 to about 3. The molar ratio of water to sulfur in the feed can be from about 2 to about 4, or from about 2.5 to about 3.

During the formation of the complex, the pressure within the first reactor 100 can be held at or near atmospheric pressure. To maintain the low pressure reaction conditions, vapor can be removed from the reactor. The main constituents of the vapor can include water and hydrogen sulfide by-product. As illustrated in FIG. 1, hydrogen sulfide of the vapor can be separated for instance at a condenser 106.

As mentioned, the reactor feed can include a stoichiometric excess of the alkali metal sulfide. In this embodiment, the product solution including the SMAB-NaSH complex will be a highly alkaline solution. This can be of benefit in one embodiment as the highly alkaline SMAB-NaSH solution can act as an absorber for the hydrogen sulfide in the first reactor 100 and can lower loss of hydrogen sulfide in the vapor stream from the reactor 100.

A portion of the water that is separated at condenser 106 can be returned to the reactor 100 to maintain the reaction conditions. Another portion of the water can be removed from the process so as to dehydrate the SMAB-NaSH solution that is formed in the first stage. For instance, the molar ratio of water to NaSH (or the ratio of oxygen to sulfur) in the product solution of the first reactor 100 can less than about 1.5, or can be between about 0.1 and about 1 such that the SMAB-NaSH complex solution that is fed to the second stage reactor 102 is near-anhydrous.

The reactor utilized in the first stage can be stainless steel, though improved corrosion can be obtained by use of other materials such as a nickel-based alloy or titanium. The components in the reactor can be subjected to heating until the temperature of the mixture has reached about 200° C. to about 210° C. During this process, water combined with the solvent and some $H_2S$ can be collected as a distillate. The distillate can be analyzed by chromatography to determine the composition of the mixture in the reactor. The complex formation reaction is an exothermic reaction, and suitable temperature control mechanisms can be utilized to maintain desired reaction conditions, as needed. The reaction can be carried out batch-wise or continuously.

The SMAB-NaSH complex can be fed to the second reactor 102 in conjunction with a dihaloaromatic monomer and a suitable solvent so as to form the polyarylene sulfide prepolymer in the second stage of the process. A dihaloaromatic monomer can be, without limitation, a dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic monomers may be used either singly or in any combination thereof. Specific exemplary dihaloaromatic monomers can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom of the dihaloaromatic monomer can be fluorine, chlorine, bromine or iodine, and two halogen atoms in the same dihaloaromatic monomer may be the same or different from each other. In one embodiment, o-dichlorobenzene, m-dichlorobenzene, p-dichlorobenzene or a mixture of 2 or more monomers thereof is used as the dihaloaromatic monomer.

The polyarylene sulfide may be a homopolymer or may be a copolymer. By a suitable, selective combination of dihaloaromatic monomers, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

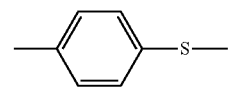
(II)

and segments having the structure of formula (III):

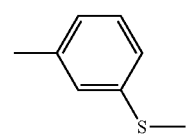
(III)

or segments having the structure of formula (IV):

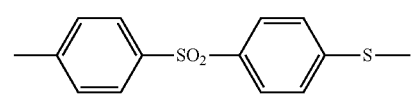
(IV)

In another embodiment, a copolymer can be formed and a monomer can be charged to the system having the formula (V):

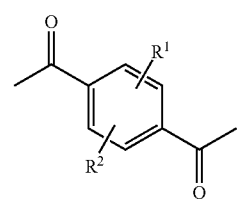
(V)

where the radicals $R^1$ and $R^2$, independently of one another, are a hydrogen, fluorine, chlorine or bromine atom or a branched or unbranched alkyl or alkoxy radical having from 1 to 6 carbon atoms. In one embodiment, a monomer of formula (V) can be p-hydroxybenzoic acid or one of its derivatives.

Another monomer as may be charged to the system can have a structure of the formula (VI):

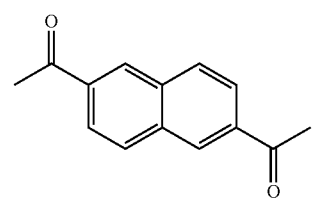
(VI)

One example of a monomer of formula (VI) is 2-hydroxynaphthalene-6-carboxylic acid. Monomers of the formula V and VI may be both charged to the system to form a polyarylene sulfide copolymer.

A polyarylene sulfide copolymer can include a segment derived from a polyarylene sulfide structure of the formula (VII):

$$+Ar-S+_q \quad (VII)$$

where Ar is an aromatic radical, or more than one condensed aromatic radical, and q is a number from 2 to 100, in particular from 5 to 20. The radical Ar in formula (VII) may be a phenylene or naphthylene radical. In one embodiment, the second segment may be derived from poly(m-thiophenylene), from poly(o-thiophenylene), or from poly(p-thiophenylene).

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be formed that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups.

By way of example, monomer components used in forming a semi-linear polyarylene sulfide can include an amount of polyhaloaromatic monomers having 2 or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic monomers having more than two halogens substituted per molecule that can be employed in forming a semi-linear starting polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5, 5'-tetramethylbiphenyl, 1,2,3,4-tetrachloronaphthalene, 1,2, 4-tribromo-6-methylnaphthalene, and the like, and mixtures thereof.

In the illustrated embodiment, the dihaloaromatic monomer can include p-dichlorobenzene (pDCB), as shown. In general, the amount of the dihaloaromatic monomer(s) per mole of the effective amount of the charged alkali metal sulfide in the prepolymer formation stage can generally be from about 1.0 to about 2.0 moles, from about 1.05 to about 2.0 moles, or from about 1.1 to about 1.7 moles. Thus, the polyarylene sulfide prepolymer can include alkyl halide (generally alkyl chloride) end groups. The prepolymer can include the halide groups in amounts as is generally known in the art. For instance, the prepolymer can include halogen in an amount of greater than about 5000 ppm, greater than about 6000 ppm, or greater than about 7000 ppm. In one embodiment, the prepolymer can have a halogen content of from about 5000 ppm to about 11000 ppm.

The dihaloaromatic monomer can be charged into the second reactor with a relatively low molar ratio of the dihaloaromatic monomer to the alkali metal hydrogen sulfide of the complex. For instance, the ratio of the dihaloaromatic monomer to sulfur charged to the second reactor can be from about 0.8 to about 1.5 or from about 1.0 to about 1.2.

The ratio of solvent to sulfur in the second stage can also be relatively low. For instance, the ratio of the alkali metal hydrogen sulfide of the complex to the organic amide solvent in the second stage (including the solvent added to the second reactor and solvent remaining in the complex solution from the first reactor) can be from about 2 to about 2.5. This relatively low ratio can increase the concentration of reactants in the second reactor, which can increase the relative polymerization rate and the per volume polymer production rate.

The second stage reaction can be carried out under an inert atmosphere, such as nitrogen, and at increased pressure. For instance, the pressure in the second reactor 102 during the second stage can be from about 500 kPa to about to about 1600 kPa, from about 600 kPa to about 1500 kPa, or from about 700 kPa to about 1400 kPa.

The second reactor 102 can include a vapor outlet for removal of vapor during the second stage in order to maintain the desired pressure level. For instance, the second reactor can include a pressure relief valve as is known in the art. Vapor removed from the second stage can be condensed and separated as at separator 108, for instance to recover unreacted monomer for return to the reactor 102. A portion of the water of the vapor can be removed to maintain the near-anhydrous conditions of the second stage, and a portion of the water can be returned to the second reactor. A small amount of water in the second reactor can generate reflux in the top of the reactor 102, which can improve separation between the water phase and the organic solvent phase in the reactor. This can in turn minimize loss of the organic solvent in the vapor phase removed from the reactor 102 as well as minimize loss of hydrogen sulfide in the vapor stream due to absorption of the hydrogen sulfide by the highly alkaline organic solvent as discussed previously.

The polymerization reaction that forms the prepolymer can generally be carried out at a temperature of from about 180° C. to about 260° C., or from about 200° C. to about 250° C. Polymerization can continue until the conversion rate of the dihaloaromatic compound attains to not less than about 50 mol % of the theoretically necessary amount. The duration of this polymerization can be, e.g., from about 0.5 to about 15 hours, or from about 1 to about 5 hours.

The termination of the prepolymer formation reaction is generally that point at which the conversion rate of the dihaloaromatic monomer in the second reactor 102 reaches not less than about 50 mol %, not less than about 70 mol %, or not less than about 90 mol % of the theoretical conversion. The theoretical conversion of the dihaloaromatic monomer can be calculated from one of the following formulas:

(a) In the case wherein the dihaloaromatic monomer has been added in excess (by molar ratio) of the alkali metal sulfide:

$$\text{Conversion rate} = \frac{X - Y}{X - Z} \times 100$$

(b) In the cases other than (a):

$$\text{Conversion rate} = \frac{X - Y}{X} \times 100$$

wherein X is the amount of the charged dihaloaromatic monomer; Y is the remaining amount of the dihaloaromatic monomer and Z is the excessive amount of dihaloaromatic monomer in moles.

(c) In the case other than (a) or (b)

Conversion rate=$A/B*100$

Wherein A is the total weight of salt collected after removal of the residual polymer and other species other than salt by-product; B is the theoretical weight of salt which is two times the molar amount of the effective sulfide present during the polymerization.

Following the second stage polymerization reaction, the mean molar mass of the prepolymer as expressed by the weight average molecular weight, $M_w$, can be from about 500 g/mol to about 30,000 g/mol, from about 1000 g/mol to about 20,000 g/mol, or from about 2000 g/mol to about 15,000 g/mol.

The polymerization reaction apparatus for use in the second stage is not especially limited, although it is typically desired to employ an apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The second reactor 102 can be stainless steel, though improved corrosion can be obtained by use of other materials such as a nickel-based alloy or titanium.

Following the second stage during which the prepolymer formation takes place, the product that exits second stage reactor 102 can include the prepolymer, the solvent, and one or more salts that are formed as a by-product of the polymerization reaction. For example, the proportion by volume of the prepolymer solution exiting the second stage reactor 102 of salt that is formed as a byproduct to the reaction can be from about 0.05 to about 0.25, or from about 0.1 to about 0.2.

Salts included in the reaction mixture can include those formed as a byproduct during the reaction as well as other salts added to the reaction mixture, for instance as a reaction promoter. The salts can be organic or inorganic, i.e. can consist of any combination of organic or inorganic cations with organic or inorganic anions. They can be at least partially insoluble in the reaction medium and have a density different from that of the liquid reaction mixture.

According to one embodiment, at least a portion of the salts in the prepolymer mixture that exits the second stage reactor 102 can be removed from the mixture at a separation unit 105 prior to the third stage polymerization in third stage reactor 104. Removal of salts prior to final polymerization can simplify final polymer separation processes as well as increase the reaction rate of the third stage polymerization as a lower sulfur to solvent ratio may be used in the third stage, effectively increasing the polymer concentration and formation rate. In addition, by carrying out a salt separation process prior to the final polymerization reaction, the capacity of the third reactor for the reactants can be increased.

The separation method utilized at separation unit 105 to remove salts from the prepolymer solution is not particularly limited. For instance, the salts can be removed by use of screens or sieves as has been utilized in traditional separation processes. A salt/liquid extraction process can alternatively or additionally be utilized in separating the salt from the prepolymer solution. In one embodiment, a hot filtration process can be utilized in which the solution can be filtered at a temperature at which the prepolymer is in solution and the salts are in the solid phase.

According to one embodiment, a salt separation process can remove about 95% or more of the salts including in the prepolymer solution that exits the second reactor 102. For instance greater than about 99% of the salts can be removed from the prepolymer solution.

Following the prepolymer formation reaction in the second stage of the process and the filtration process, a third stage of the formation can take place during which the molecular weight of the prepolymer is increased and the halogen content of the polymer is decreased, for instance in a third reactor 104. Input to the third reactor 104 can include the prepolymer solution from the second reactor 102 in addition to solvent, one or more dihaloaromatic monomers, and a sulfur-containing monomer that is provided such that the sulfur that is added to this polymerization is a relatively low fraction of the total amount of sulfur added to the entire multi-stage formation process. For instance, the sulfur-containing monomer is provided at a concentration such that the amount of sulfur provided at this stage is from about 0.1 wt. % to about 10 wt. %, or from about 0.5 wt. % to about 2.5 wt. % by weight of the entire amount of sulfur charged to the process. In the illustrated embodiment, the sulfur-containing monomer is sodium sulfide, but this is not a requirement of the third stage, and other sulfur containing monomers, such as an alkali metal hydrogen sulfide monomer may alternatively be utilized.

The reaction conditions within the third reactor 104 can include a high molar ratio for the solvent to the sulfur-containing monomer (i.e., a low fraction of the sulfide reactant). For instance, the ratio of solvent to moles of sulfur can be from about 2.5 to about 5 or from about 3 to about 4.5.

The dihaloaromatic monomers added to the third stage can be the same or different as the dihaloaromatic monomers added in the second stage. For example, it is possible to include a monohalo monomer (not necessarily an aromatic compound) in one or both of the second or the third stage in order to form end groups of the polyarylene sulfide or to regulate the polymerization reaction and/or the molecular weight of the polyarylene sulfide.

In one embodiment, the third reaction conditions can be nearly anhydrous, with the ratio of water to the sulfur-containing monomer less than about 0.2, for instance between 0 and about 0.2. The low water content during the third stage of the process can increase the polymerization rate and the polymer yield as well as reduce formation of undesired side reaction by-products as the conditions are favorable for nucleophilic aromatic substitution. Moreover, as pressure increases in the third stage are generally due to water vaporization, low water content during this stage can allow the third reaction to be carried out at a constant, relatively low pressure, for instance less than about 1500 kPa. As such, the third reactor 104 need not be a high pressure reactor.

Near-anhydrous conditions in this stage are not a requirement, however, and in one embodiment, higher water content can be utilized in the third stage. For example, the ratio of water to the sulfur-containing monomer in the third reactor 104 can be greater than about 0.2, greater than about 1, or greater than about 2. For instance, the ratio of water to the sulfur-containing monomer in the third reactor can be from about 2 to about 4, or from about 2.5 to about 3, in one embodiment.

The third reactor 104 can include a vapor outlet for removal of vapor during the third stage in order to maintain low pressure in the reactor. For instance, the third reactor can include a pressure relief valve as is known in the art. Vapor removed from the third stage can be condensed and separated as at separator 110 that can separate, e.g., hydrogen sulfide from water of the vapor.

The reaction mixture of the third stage can be heated to a temperature of from about 120° C. to about 280° C., or from about 200° C. to about 270° C. or from about 250° C. to about 260° C. and the polymerization can continue until the melt viscosity of the thus formed polymer is raised to the desired final level, e.g., about 500 Poise or less as discussed previously in those embodiments in which a low viscosity polymer is formed. Of course, the process is not limited to the formation of low viscosity polymers, and in another embodiment a higher viscosity low halogen content polymer can be formed. The duration of this polymerization step can be, e.g., from about 0.5 to about 20 hours, or from about 1 to about 10 hours.

The polymerization reaction apparatus for use in the third stage is not especially limited, and can be the same or different as the reaction apparatus utilized in the second stage, e.g., a reaction apparatus that is commonly used in formation of high viscosity fluids at increased pressure. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. The third reactor 104 can be stainless steel, though improved corrosion can be obtained by use of other materials such as a nickel-based alloy or titanium.

Following the third stage, and any desired post-formation processing, the polyarylene sulfide may be discharged from the third reactor 104, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

Figure 2:
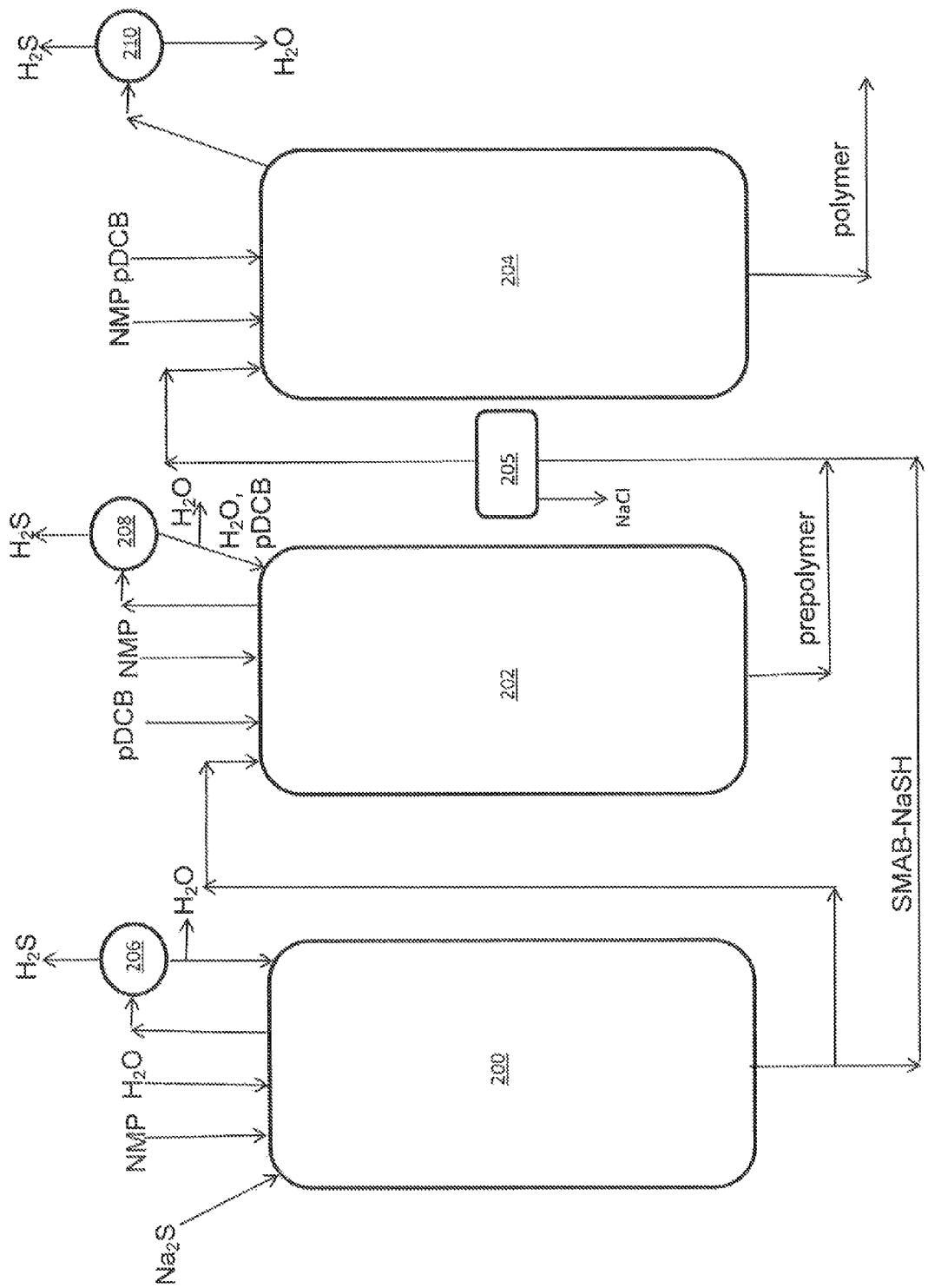
FIG. 2 is a flow diagram for another embodiment of a polyarylene sulfide formation process as described herein.

FIG. 2 illustrates another embodiment of the multi-stage polyarylene sulfide formation process. As can be seen, this process is similar to the multi-stage process of FIG. 1 and includes a first reactor 200, a second reactor 202 and a third reactor 204. The feed to the first reactor can include a sulfur-containing monomer, such as an alkali metal sulfide (e.g., $Na_2S$), an organic amide solvent (e.g., NMP), and water. The reactor 200 can include a vapor treatment stream including a condenser 206 similar to that of FIG. 1. The monomer complex (e.g., SMAB-NaSH) formed in the first reactor 200 can be fed to the second reactor in conjunction with a dihaloaromatic monomer (pDCB) and solvent (NMP) to form a prepolymer. As shown, the second reactor can include a vapor treatment stream including a condenser 208 similar to that of FIG. 1. The prepolymer solution that exits the second reactor 202 can be subjected to salt separation as at separation unit 205 before entering the third reactor 204, as discussed above.

As illustrated in FIG. 2, according to this embodiment, the sulfur-containing monomer fed to the third reactor 204 can include a portion of the complex including the hydrolysis product of the solvent and a hydrogen sulfide monomer that was formed in the first stage of the process at the first reactor 200. Utilization of the complex formed in the first stage of the process in both the second and third polymerization stages of the process can improve overall efficiency of the process and decrease over costs of the process. The complex formed in the first stage can be fed to the third reactor 204 at a low fraction of the sulfide reactant as previously described and in conjunction with a dihaloaromatic monomer and additional solvent and the molecular weight of the prepolymer formed in the second stage can be increased as the halogen content is lowered. As shown, the third reactor 204 can include a vapor treatment stream including a condenser 210 and water can be removed from the third reactor, as desired.

Following the third stage polymerization reaction, post treatment as is generally known in the art can be carried out to purify or otherwise improve the characteristics of the polyarylene sulfide formed by the process. For example, a second filtration process can be carried out that can remove any additional salt from the product mixture, for instance any salt formed as the molecular weight of the prepolymer is increased during the third stage polymerization. In one embodiment, the polyarylene sulfide can be subjected to a crystallization process.

Following formation, the polyarylene sulfide may be washed with liquid media. For instance, the polyarylene sulfide may be washed with water, acetone, N-methyl-2-pyrrolidone, a salt solution, and/or an acidic media such as acetic acid or hydrochloric acid. The polyarylene sulfide can be washed in a sequential manner that is generally known to persons skilled in the art. The polyarylene sulfide can be subjected to a hot water washing process. The temperature of a hot water wash can be at or above about 100° C., for instance higher than about 120° C., higher than about 150° C., or higher than about 170° C. Generally, distilled water or deionized water can be used for hot water washing. In one embodiment, a hot water wash can be conducted by adding a predetermined amount of the polyarylene sulfide to a predetermined amount of water and heating the mixture under stirring in a pressure vessel. By way of example, a bath ratio of up to about 200 grams of polyarylene sulfide per liter of water can be used. Following the hot water wash, the polyarylene sulfide can be washed several times with warm water, maintained at a temperature of from about 10° C. to about 100° C. A wash can be carried out in an inert atmosphere to avoid deterioration of the polymer.

In one embodiment, organic solvent washing can be combined with hot water washing and/or warm water washing. When a high-boiling-point organic solvent such as N-methylpyrrolidone is used, the residual organic solvent can be removed by washing with water or warm water after the organic solvent washing, and distilled water or deionized water can be used for this washing.

A polyarylene sulfide formed according to the multi-stage process can exhibit beneficial characteristics. For instance, the bulk density of the polymer can generally be between about 0.2 grams per cubic centimeter and about 1.5 grams per cubic centimeter, for instance between about 0.3 grams per cubic centimeter and about 1 gram per cubic centimeter as determined according to ISO Test No. 1183 (technically equivalent to ASTM D792). The volatile content of the polymer can be about 0.5 wt. % or less, for instance about 0.2 wt. % or less, based upon weight loss following vacuum drying.

The crystallization temperature, $T_{c2}$ can be between about 190° C. and about 300° C., for example between about 200° C. and about 265° C., as determined by differential scanning calorimetry, for instance as described in ISO Standard 10350. The pH of the formed polymer can generally be between about 3 and about 12. The polyarylene sulfide can also have a good appearance. For instance, the polyarylene sulfide can have a yellowness index of less than about 18.5 as determined according to ASTM e313.

The process can form a polyarylene sulfide with a good particle size distribution. For instance, the $d_{10}$ value can be from about 15 micrometers to about 30 micrometers, the $d_{50}$ value can be from about 70 micrometers to about 100 micrometers, and the $d_{90}$ value can be from about 100 micrometers to about 150 micrometers. The median diameter of the particles can be from about 100 micrometers to about 1000 micrometers. In one embodiment, about 95% or more of the particles can be between about 50 micrometers and about 150 micrometers in particle size. For instance, about 0.5 wt. % or less of the particles can have a diameter of greater than about 2800 micrometers, and about 10 wt. % or less of the polymers can have a diameter of less than about 110 micrometers.

The polyarylene sulfide can be utilized in forming products as are generally known in the art. For instance, the polyarylene sulfide can be combined with additives such as one or more of fillers (e.g., fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in a thermoplastic composition of the polyarylene sulfide in conventional amounts.

A mixture that is melt processed to form a melt processed thermoplastic composition may include a polyarylene sulfide (or a blend of multiple polyarylene sulfides) in an amount from about 40 wt. % to about 90 wt. % by weight of the mixture, for instance from about 45% wt. % to about 80 wt. % by weight of the mixture.

A thermoplastic composition including the polyarylene sulfide may be melt processed according to techniques known in the art. For example, the thermoplastic composition may be melt-kneaded in conjunction with one or more additives in a single-screw or multi-screw extruder at a temperature of from about 250° C. to about 320° C. In one embodiment, the composition may be melt processed in an extruder that includes multiple temperature zones. For instance, the composition may be melt processed in an extruder that includes a temperature zone that is maintained at a temperature of between about 250° C. and about 320° C.

Conventional shaping processes for forming articles including the polyarylene sulfide may be used. For instance, extrusion, injection molding, blow-molding, thermoforming, foaming, compression molding, hot-stamping, fiber spinning and so forth can be used.

As indicated above, a thermoplastic composition of the polyarylene sulfide can be particularly well suited for use in injection molding operations. For example, as is known in the art, injection can occur in two main phases—i.e., an injection phase and holding phase. During the injection phase, the mold cavity is completely filled with the molten thermoplastic composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

Figure 3:
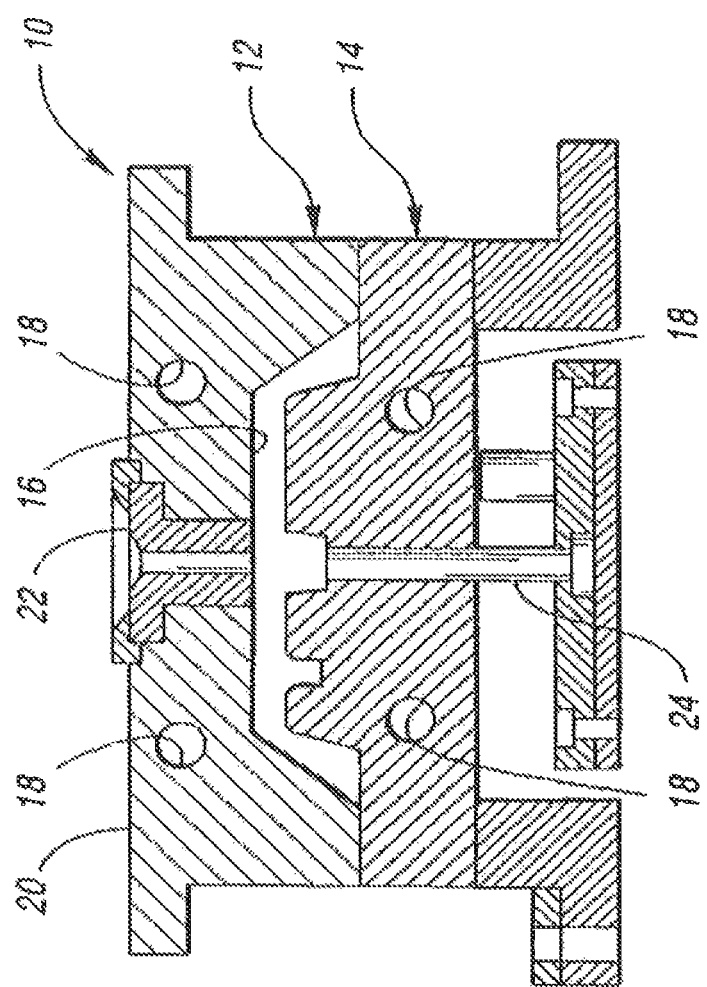
FIG. 3 is a schematic illustration of an injection molding apparatus as may be utilized in conjunction with a thermoplastic composition of the polyarylene sulfide as described herein.

Any suitable injection molding equipment may be employed. Referring to FIG. 3, for example, one embodiment of an injection molding apparatus or tool 10 that may be employed in the present invention is shown. In this embodiment, the apparatus 10 includes a first mold base 12 and a second mold base 14, which together define an article or component-defining mold cavity 16. The molding apparatus 10 also includes a resin flow path that extends from an outer exterior surface 20 of the first mold half 12 through a sprue 22 to a mold cavity 16. The resin flow path may also include a runner and a gate, both of which are not shown for purposes of simplicity. The thermoplastic composition may be supplied to the resin flow path using a variety of techniques. For example, the thermoplastic composition may be supplied (e.g., in the form of pellets) to a feed hopper attached to an extruder barrel that contains a rotating screw (not shown). As the screw rotates, the pellets are moved forward and undergo pressure and friction, which generates heat to melt the pellets. Additional heat may also be supplied to the composition by a heating medium that is in communication with the extruder barrel. One or more ejector pins 24 may also be employed that are slidably secured within the second mold half 14 to define the mold cavity 16 in the closed position of the apparatus 10. The ejector pins 24 operate in a well-known fashion to remove a molded part from the cavity 16 in the open position of the molding apparatus 10.

A cooling mechanism may also be provided to solidify the resin within the mold cavity. In FIG. 3, for instance, the mold bases 12 and 14 each include one or more cooling lines 18 through which a cooling medium flows to impart the desired mold temperature to the surface of the mold bases for solidifying the molten material. The total cooling time can be determined from the point when the composition is injected into the mold cavity to the point that it reaches an ejection temperature at which it can be safely ejected.

The thermoplastic composition can be readily formed into parts having a small dimensional tolerance. For example, the thermoplastic composition may be molded into a part for use in an electronic component. The part may be in the form of a planar substrate having a thickness of about 100 millimeters or less. In one embodiment, a part may possess certain features (e.g., walls, ridges, etc.) with a small dimensional tolerance. Examples of electronic components that may employ such a molded part include, for instance, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), etc.

Wireless electronic devices, however, are particularly suitable. Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Other shaped articles that may be formed of a thermoplastic composition including the polyarylene sulfide may include structural and non-structural shaped parts, for instance for appliances, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, and pond liners, to name a few. Other useful articles besides moldings, extrusion and fibers include wall panels, overhead storage lockers, serving trays, seat backs, cabin partitions, window covers, and electronic packaging handling systems such as integrated circuit trays.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Test Methods

Melt Viscosity:

The melt viscosity (Pa-s) was determined in accordance with ISO Test No. 11443 at 350° C. and at a shear rate of 1000 $s^{-1}$ using a Dynisco 7001 capillary rheometer. The rheometer orifice (die) had a diameter of 1 mm, length of 20 mm, L/D ratio of 20.1, and an entrance angle of 180°. The diameter of the barrel was 9.55 mm±0.005 mm and the length of the rod was 233.4 mm.

Chlorine Content:

Chlorine content was determined according to an elemental analysis using Parr Bomb combustion followed by Ion Chromatography.

Example

Several polyphenylene sulfide samples were prepared as follows:

SMAB-NaSH Preparation

A 2 liter Parr titanium reactor equipped with an addition funnel and a distillation apparatus was charged with 62.31 g of NaOH (95.93%, 1.49 moles), 319.74 g N-methylpyrrolidinone (NMP) and 22.11 g $H_2O$. The reactor was sealed and purged with a slow stream of nitrogen gas. The mixture was stirred and the temperature raised to 100° C. After the target temperature was reached, molten NaSH hydrate (2 mol S) was added by means of a heated addition funnel. The temperature of the mixture was raised to 202° C. while a stream of distillate was continually collected. After the dehydration stage, the contents of the reactor was found to have a molar ratio of $H_2O$ to S equivalent to 1.5, and a molar ratio of NMP to S equivalent to 2.5. This SMAB-NaSH mixture was transferred to an addition funnel while molten and allowed to cool.

1st Stage Polymerization

A 2-liter Parr titanium reactor equipped with an addition funnel (pre-charged with the SMAB-NaSH) was charged with 242.55 g p-dichlorobenzene (p-DCB, 1.65 moles) and 72.76 g NMP. After sealing the reactor, the temperature was raised to 200° C. At the same time, the SMAB-NaSH was heated to 200° C. After the pre-heating stage, the molten SMAB-NaSH was slowly added over 30-45 minutes while the temperature of the reactor was ramped up to 245° C. and held for a total of 4 hours.

2nd Stage Polymerization

The content of the $1^{st}$ stage polymerization reactor was transferred to a 1-liter Mott filter pre-heated to 230° C. The mixture was filtered through a Mott grade 40 sintered metal disc using a differential pressure of 40-60 psi. The filter cake was washed 3 times with hot NMP. The combined filtrate was concentrated by means of a flash distillation until the mixture was 25% solids. At this point, 3.66 g of $Na_2S.9H_2O$ (0.76 mole % of initial sulfur charged in the $1^{st}$ polymerization), 3.29 g $H_2O$ and 0.61 g of NaOH was added to the mixture. The temperature was raised to 250° C. and held at that temperature for 4 hours. The reactor was gradually cooled to room temperature at a rate of 1° C./min. The slurry was washed twice with NMP, once with 3% acetic acid then 4 times with DI water. The polyphenylene sulfide granules were dried under vacuum at 105° C. for 12 hours. A sample was analyzed for melt viscosity and for organically-bound chlorine content. For comparative purposes, commercially available grades of polyphenylene sulfide commonly used in injection molding applications were analyzed for melt viscosity and for chlorine content. Results are shown in the table below.

| Sample No. | Melt viscosity (Poise @ 310° C., 1200 $sec^{-1}$) following second polymerization | Chlorine content (ppm) prepolymer | Chlorine content (ppm) final polymer |
|---|---|---|---|
| 1 | 57 | 7500 | 500 |
| 2 | 205 | 7400 | 800 |
| 3 | 121 | 9700 | 600 |
| 4 | 89 | 10000 | 500 |
| 5 | 448 | 10200 | 700 |
| 6 | 388 | 8900 | 900 |
| Commercial 1 | 275 | — | 4000 |
| Commercial 2 | 450 | — | 2300 |

As can be seen, the melt viscosity range for the polymers formed according to the disclosed method was comparable with commercial grades, but the chlorine end group content was significantly lower.

While certain representative embodiments and details have been shown for the purpose of illustrating the subject invention, it will be apparent to those skilled in this art that various changes and modifications may be made therein without departing from the scope of the subject invention.

What is claimed is:

1. A multi-stage method for forming a polyarylene sulfide comprising:

providing a complex that includes an alkali metal organic amine carboxylic acid salt and an alkali metal hydrogen sulfide;

carrying out a first polymerization reaction in a first reactor during which a first amount of the complex is supplied to the first reactor and reacted with a first dihaloaromatic monomer in the presence of a first organic amide solvent to form a polyarylene sulfide prepolymer;

thereafter, carrying out a second polymerization reaction in a second reactor during which a second amount of the complex is supplied to the reactor and reacted with the polyarylene sulfide prepolymer and a second dihaloaromatic monomer to form the polyarylene sulfide.

2. The method of claim 1, wherein the first dihaloaromatic monomer and/or the second dihaloaromatic monomer comprises dichlorobenzene.

3. The method of claim 1, wherein the prepolymer has a weight average molecular weight of from about 500 grams per mole to about 30,000 grams per mole.

4. The method of claim 1, wherein the prepolymer has a halogen content of greater than about 5000 ppm.

5. The method of claim 1, wherein the polyarylene sulfide has a halogen content of about 1000 ppm or less.

6. The method of claim 1, wherein the polyarylene sulfide has a melt viscosity of less than about 500 Poise or less.

7. The method of claim 1, wherein the reaction forming the polyarylene sulfide prepolymer also forms a salt, the method further comprising separating the salt from the prepolymer.

8. The method of claim 1, wherein the second dihaloaromatic monomer is the same as the first dihaloaromatic monomer.

9. The method of claim 1, further comprising purifying the polyarylene sulfide.

10. The method of claim 1, further comprising combining the polyarylene sulfide with one or more additives.

11. The method of claim 1, wherein the first organic amide solvent is N-methylpyrrolidone.

12. The method of claim 1, wherein the second polymerization reaction occurs in the presence of a second organic amide solvent.

13. The method of claim 12, wherein the second organic amide solvent is N-methylpyrrolidone.

14. The method of claim 12, wherein the molar ratio of the second organic amide solvent to sulfur added during the second polymerization reaction is from about 2.5 to about 5.

15. The method of claim 12, wherein the second polymerization reaction also occurs in the presence of water.

16. The method of claim 15, wherein the molar ratio of water to sulfur added during the second polymerization reaction is from about 2 to about 4.

17. The method of claim 1, wherein the molar ratio of the first dihaloaromatic monomer to sulfur charged during the first polymerization reaction is from about 1.0 to about 1.2.

18. The method of claim 1, wherein the complex is formed by reacting an organic amide solvent, alkali metal sulfide, and water.

19. The method of claim 18, wherein the first organic amide solvent is N-methylpyrrolidone.

20. The method of claim 18, wherein the alkali metal sulfide is formed from the reaction of sodium hydrogen sulfide and sodium hydroxide.

21. The method of claim 18, wherein the complex is formed in a third reactor.

22. The method of claim 1, wherein the complex includes sodium methylaminobutyrate and sodium hydrogen sulfide.

23. The method of claim 1, wherein the second amount of the complex constitute from about 0.1% to about 10% by weight of the total amount of the complex provided.

24. The method of claim 1, wherein from about 0.1% to about 10% by weight of the total amount of sulfur charged during the multi-stage method is charged to the second polymerization reaction.

25. The method of claim 1, wherein the polyarylene sulfide is a linear polyphenylene sulfide.

* * * * *